United States Patent
Tabuchi et al.

(10) Patent No.: US 8,151,815 B2
(45) Date of Patent: Apr. 10, 2012

(54) SOLENOID VALVE CONTROL APPARATUS

(75) Inventors: Youji Tabuchi, Yokohama (JP);
 Nobufumi Yamane, Machida (JP);
 Hiroki Taniguchi, Fuji (JP)

(73) Assignee: Jatco Ltd, Fuji-shi (JP)

( * ) Notice: Subject to any disclaimer, the term of this patent is extended or adjusted under 35 U.S.C. 154(b) by 466 days.

(21) Appl. No.: 12/401,264

(22) Filed: Mar. 10, 2009

(65) Prior Publication Data
 US 2009/0229673 A1 Sep. 17, 2009

(30) Foreign Application Priority Data
 Mar. 13, 2008 (JP) .................. 2008-063467

(51) Int. Cl.
 *F16K 51/00* (2006.01)

(52) U.S. Cl. ................. 137/15.01; 137/237; 251/129.15; 192/226

(58) Field of Classification Search ................. 137/237, 137/238, 242, 246, 15.04–15.07; 251/129.05, 251/129.15; 192/215, 225, 226
 See application file for complete search history.

(56) References Cited

U.S. PATENT DOCUMENTS

| | | | |
|---|---|---|---|
| 3,470,892 A * | 10/1969 | Barker | ............................ 137/1 |
| 6,592,099 B2 * | 7/2003 | Yamamoto et al. | ...... 251/129.05 |
| 6,729,601 B2 * | 5/2004 | Freisinger et al. | ....... 251/129.05 |
| 6,874,525 B2 | 4/2005 | Kimura et al. | |
| 7,104,522 B2 * | 9/2006 | Bircann | ........................ 137/242 |

FOREIGN PATENT DOCUMENTS

JP 2005-54970 A 3/2005

* cited by examiner

*Primary Examiner* — Kevin Lee
(74) *Attorney, Agent, or Firm* — Foley & Lardner LLP

(57) ABSTRACT

A solenoid valve control apparatus has a solenoid valve having first and second solenoid valves that output first and second solenoid pressures respectively, a pressure regulation valve that works with the first and second solenoid pressures being working signal pressures, and a foreign matter removal controller that removes a foreign matter that adheres to a valve open/close portion of the solenoid valve. Each of the first and second solenoid valves has a solenoid coil that drives a plunger inside the solenoid valve in accordance with an application current. The foreign matter removal controller is configured so that when applying the rectangular-wave current, which performs a reciprocating movement of the plunger and removes the foreign matter, to the solenoid coil of one solenoid valve of the first and second solenoid valves, a current application to the solenoid coil of the other solenoid valve, by which the solenoid pressure becomes a maximum pressure range, is maintained.

10 Claims, 8 Drawing Sheets

SOLENOID VALVE CONTROL APPARATUS

BACKGROUND OF THE INVENTION

The present invention relates to a solenoid valve control apparatus that removes foreign matter or object formed by adhesion at a valve open/close portion, by performing a reciprocating movement of a plunger through the application of a rectangular-wave current of low frequency in place of a high-frequency driving current of a normal control.

In a case of a normally high two-way linear solenoid valve that outputs a high pressure with the valve closed when a solenoid current applied to a solenoid coil is 0 (zero), the foreign matter is apt to adhere to valve open/close portion between the plunger (or a valve body integrally formed with the plunger) and a valve seat inside the valve. The reason why the foreign matter is apt to adhere to valve open/close portion is that the solenoid current applied to the solenoid coil is the high-frequency driving current and oil pulsates at the valve open/close portion then the oil accumulates or builds up there with the valve closed when the solenoid current is 0 (zero).

For this problem, in Japanese Patent Provisional Publication No. 2005-54970 (hereinafter is referred to as "JP2005-54970"), a solenoid valve control apparatus that pulls away the foreign matter that adheres to or becomes trapped at the valve open/close portion has been proposed. More specifically, in order to efficiently remove the foreign matter that adheres to the valve open/close portion of the linear solenoid valve, as the solenoid current applied to the solenoid coil, a rectangular-wave current by which maximum and minimum values of a current command value are alternately repeated is applied, and the reciprocating action or movement of the plunger is performed, then the foreign matter is removed.

SUMMARY OF THE INVENTION

In this conventional solenoid valve control apparatus, however, upon execution of a foreign matter removal control, instead of the application of the high-frequency driving current (for example, a duty driving current of driving frequency 800 Hz) used at the normal control, for instance, a rectangular-wave current of low frequency by which a maximum current value and a minimum current value are alternately repeated at 50 Hz is applied, and a gap or space between the valve seat and the valve body becomes larger than that of the normal control, then the foreign matter that adheres to the valve open/close portion is removed.

For this reason, in a case where the solenoid valve control apparatus has a pressure regulation valve (such as a switching valve and a pressure regulating valve) that works with a solenoid pressure from the linear solenoid valve being a working signal pressure, since a large pulsation of the oil occurs upon the execution of the foreign matter removal control that opens up the gap between the valve seat and the valve body large, a spool of the pressure regulation valve repeatedly strikes or hits against right and/or left end surfaces of a valve hole (or slot), a striking sound thus occurs. In particular, in a case where a plurality of solenoid pressures act on the pressure regulation valve, when executing the foreign matter removal control while operating a plurality of the linear solenoid valves at the same time, the pulsation of the oil becomes still larger due to a synergistic effect, and the striking sound occurring in the pressure regulation valve increases up to a noise level. Hence, the solenoid valve control apparatus having the pressure regulation valve has such problems.

It is therefore an object of the present invention to provide a solenoid valve control apparatus that can prevent the occurrence of the striking sound in the pressure regulation valve while efficiently removing the foreign matter by executing a backup control in liaison with the foreign matter removal control upon execution of the foreign matter removal control.

According to one aspect of the present invention, a solenoid valve control apparatus comprises: a solenoid valve having; (a) a first solenoid valve that outputs a first solenoid pressure; (b) a second solenoid valve that outputs a second solenoid pressure, each of the first and second solenoid valves having a solenoid coil that drives a plunger inside the solenoid valve in accordance with an application current, the plunger controlling communication between a solenoid pressure port and a drain port, a pressure regulation valve that works with the first and second solenoid pressures from the solenoid valve being working signal pressures of a spool; and a foreign matter removal control means that removes a foreign matter that adheres to a valve open/close portion of the solenoid valve, by applying a rectangular-wave current which performs a reciprocating movement of the plunger to the solenoid coil, upon execution of a foreign matter removal control, and the foreign matter removal control means being configured so that when applying the rectangular-wave current, which removes the foreign matter, to the solenoid coil of one solenoid valve of the first and second solenoid valves, a current application to the solenoid coil of the other solenoid valve, by which the solenoid pressure becomes a maximum pressure range, is maintained.

According to another aspect of the invention, a method for controlling a solenoid valve including a first solenoid valve that outputs a first solenoid pressure and a second solenoid valve that outputs a second solenoid pressure, each of the first and second solenoid valves having a solenoid coil that drives a plunger inside the solenoid valve in accordance with an application current, the plunger controlling communication between a solenoid pressure port and a drain port, the method comprises: when applying a rectangular-wave current, which performs a reciprocating movement of the plunger and removes a foreign matter that adheres to a valve open/close portion of the solenoid valve, to the solenoid coil of one solenoid valve of the first and second solenoid valves, maintaining a current application to the solenoid coil of the other solenoid valve, by which the solenoid pressure becomes a maximum pressure range.

The other objects and features of this invention will become understood from the following description with reference to the accompanying drawings.

DETAILED DESCRIPTION OF THE INVENTION

According to a solenoid valve control apparatus of the present invention, by a foreign matter removal control means (or a foreign matter removal controller), when applying a rectangular-wave current, which removes the foreign matter, to a solenoid coil of one solenoid valve of two solenoid valves of first and second solenoid valves, a current application to a solenoid coil of the other solenoid valve, by which a solenoid pressure becomes a maximum pressure range or level, is maintained.

As a result, even though the oil pulsates large through the application of the rectangular-wave current to the solenoid coil of the one solenoid valve, irrespective of variation in the pressure of the oil acting on a spool of a pressure regulation valve by the pulsation, the spool is kept pushed or pressed against one side of end surfaces by the solenoid pressure of the maximum pressure range of the solenoid coil of the other solenoid valve.

Consequently, at the one solenoid valve side, by the large pulsation of the oil, a plunger performs the reciprocating movement, and the foreign matter that adheres to the valve open/close portion is pulled away, then the foreign matter is efficiently removed. Meanwhile, at the other solenoid valve side, by executing a backup control that outputs the solenoid pressure of maximum pressure range, the spool of the pressure regulation valve is kept pushed against the one side of end surfaces, then the occurrence of the striking sound in the pressure regulation valve is prevented.

As a result, upon the execution of the foreign matter removal control, by executing the backup control in liaison with the foreign matter removal control, the occurrence of the striking sound in the pressure regulation valve can be prevented while efficiently removing the foreign matter.

Embodiments of the present invention will now be explained below with reference to the drawings.

A system of the solenoid valve control apparatus of an embodiment 1 will be explained with reference to FIG. 1.

Embodiment 1

Figure 1:
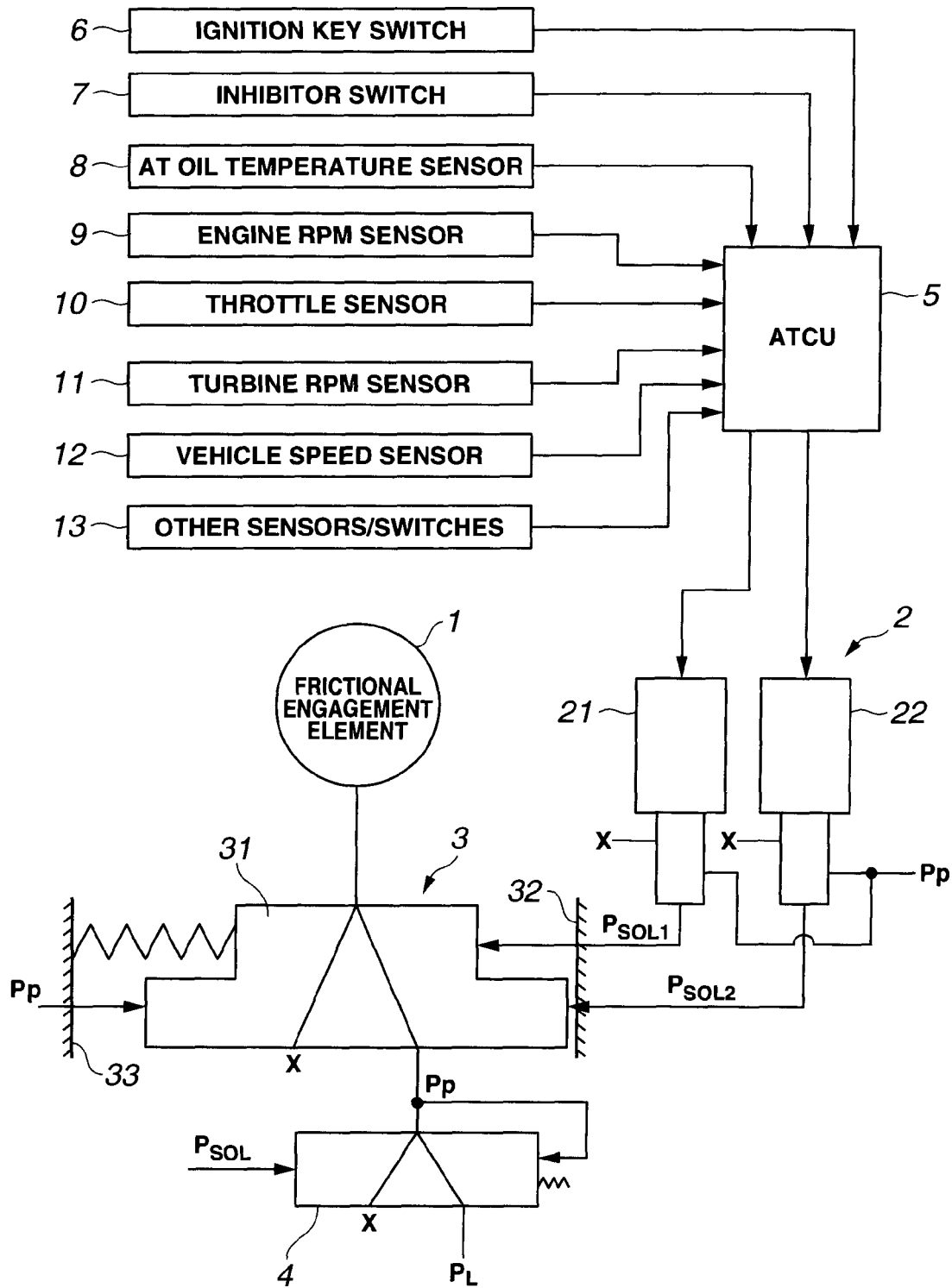
FIG. 1 is a block diagram of a hydraulic control system of an embodiment 1, showing a solenoid valve control apparatus applied to an automatic transmission of a vehicle with an engine.

As shown in FIG. 1, the solenoid valve control apparatus of the embodiment 1 has a frictional engagement element 1, a normally high two-way linear solenoid valve (solenoid valve) 2, a switching valve (hydraulic control or regulation valve) 3, a control valve 4, and an automatic transmission control unit 5.

The frictional engagement element 1 is a shift element, such as a hydraulic band brake, a hydraulic multiple disc clutch and a hydraulic multiple disc brake. The frictional engagement element 1 is engaged by an engagement element pressure Pc when the switching valve 3 selects the engagement element pressure Pc, and is disengaged by release of the engagement element pressure Pc when the switching valve 3 selects a drain.

The normally high two-way linear solenoid valve 2 is installed inside a valve body of a control valve unit of the automatic transmission, and has a first solenoid valve 21 and a second solenoid valve 22. The first solenoid valve 21 produces a first solenoid pressure $P_{SOL1}$ provided to the switching valve 3 through application of a first solenoid current $I_{SOL1}$ (for example, a duty driving current of driving frequency 800 Hz) from the automatic transmission control unit 5, with a pilot pressure $P_P$ (constant pressure) that is produced by a pilot valve (not shown) being a source pressure. Likewise, the second solenoid valve 22 produces a second solenoid pressure $P_{SOL2}$ provided to the switching valve 3 through application of a second solenoid current $I_{SOL2}$ from the automatic transmission control unit 5, with the pilot pressure $P_P$ being the source pressure.

The switching valve 3 is a valve that performs a switching operation of a spool 31 with the first solenoid pressure $P_{SOL1}$ from first solenoid valve 21 and the second solenoid pressure $P_{SOL2}$ from the second solenoid valve 22 being working (or operation) signal pressures. More specifically, when the first solenoid pressure $P_{SOL1}$ and the second solenoid pressure $P_{SOL2}$ are provided to this switching valve 3, the spool 31 shifts or moves from a position of a right side valve hole end surface 32 up to a position where the spool 31 touches a left side valve hole end surface 33 in a left direction in FIG. 1, then the engagement element pressure of the frictional engagement element 1 is drained.

The control valve 4 is a pressure regulation spool valve that regulates or controls the engagement element pressure Pc provided to the frictional engagement element 1 with a solenoid pressure $P_{SOL}$ from a linear solenoid valve (not shown) being a working (or operation) signal pressure and with a line pressure $P_L$ from a line pressure regulation valve (not shown) being a source pressure. This control valve 4 performs a pressure regulation or control in which the higher the solenoid pressure $P_{SOL}$, the higher engagement element pressure Pc is set.

As for the automatic transmission control unit 5, as shown in FIG. 1, sensor signals and switch signals from an ignition key switch 6, an inhibitor switch 7, an AT oil temperature sensor 8, an engine rpm sensor 9, a throttle sensor 10, a turbine rpm sensor 11, a vehicle speed sensor 12, and other sensors/switches 13 are input to the automatic transmission control unit 5.

This automatic transmission control unit 5 executes a shift control operation. More specifically, the automatic transmission control unit 5 outputs a shift start command when an operating point defined by a throttle opening and a vehicle speed crosses an up-shift line or a down-shift line on a predetermined shift schedule (for instance, a shift schedule of forward 7 speeds). In addition, the automatic transmission control unit 5 executes a calculation operation of an engagement element pressure command value at a shift transition in accordance with the shift start command or a change of a gear ratio (or a transmission ratio) Gr determined by a turbine rpm (an AT input rpm) and the vehicle speed (an AT output rpm). Furthermore, in the automatic transmission control unit 5, as an initialization operation, a foreign matter removal control operation, which removes a foreign matter that adheres to valve open/close portions of the first solenoid valve 21 and the second solenoid valve 22, is performed.

Figure 2:
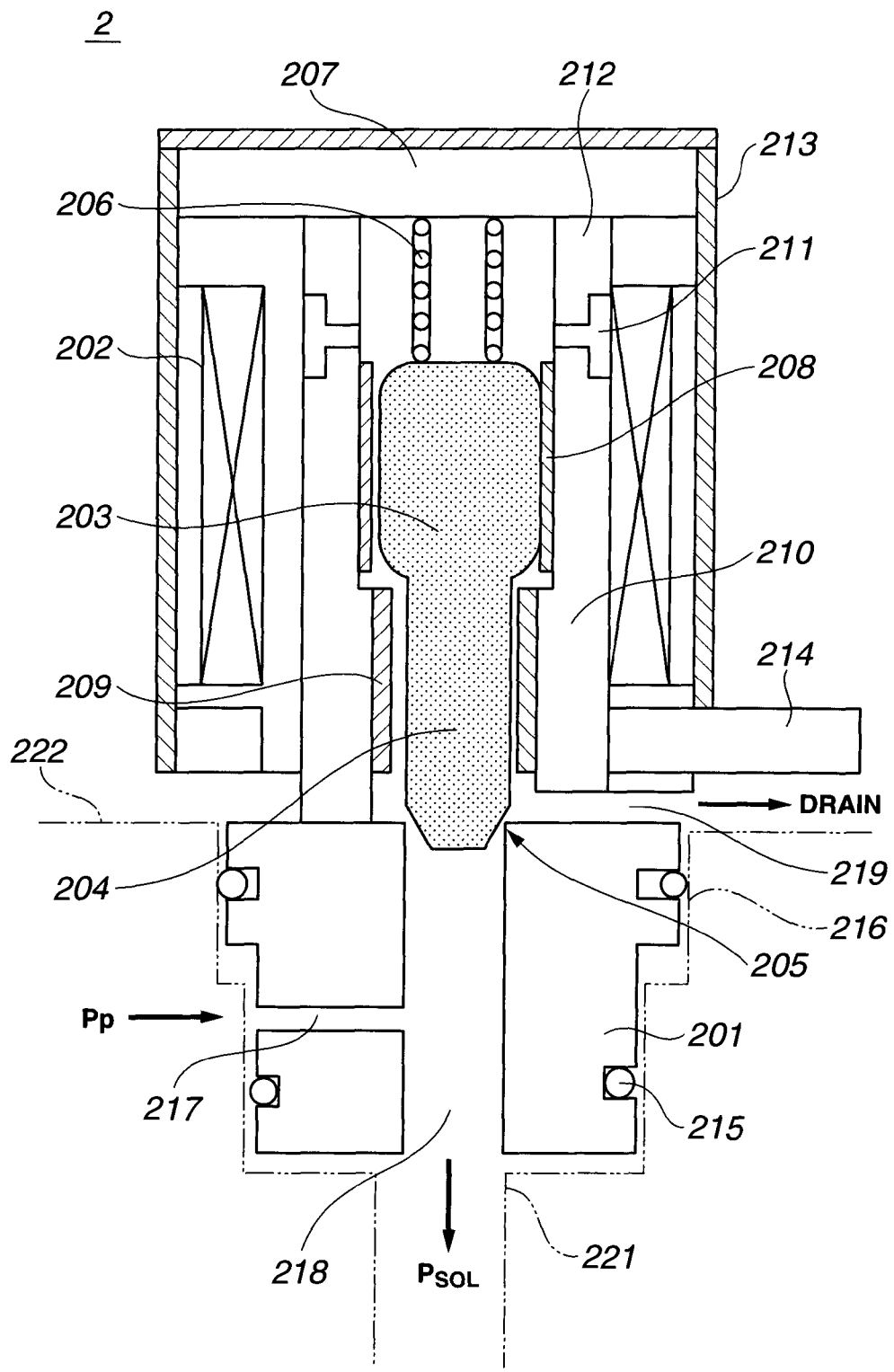
FIG. 2 is a sectional view of a normally high two-way linear solenoid valve 2 of one example, using a first solenoid valve 21 and a second solenoid valve 22 in the solenoid valve control apparatus of the embodiment 1.

FIG. 2 is a sectional view of the normally high two-way linear solenoid valve 2 of one example, using the first solenoid valve 21 and the second solenoid valve 22.

As can be seen in FIG. 2, the normally high two-way linear solenoid valve 2 has a valve housing 201, a valve solenoid 202, a plunger 203, a valve body 204, a valve seat 205, a spring 206, a shim 207, a plunger bearing 208, a valve body bearing 209, a first bearing supporting frame 210, a second bearing supporting frame 211, a shim supporting frame 212, a valve cover 213, an installation flange 214, a first seal ring 215, a second seal ring 216, a pilot pressure port 217, a solenoid pressure port 218, and a drain port 219. Here, as the plunger bearing 208 and the valve body bearing 209, for instance, plastic material such as PTFE is used.

This normally high two-way linear solenoid valve 2 is secured to a valve body 222 of the control valve unit in which a solenoid pressure oil passage 221 is formed, through the installation flange 214. When a solenoid current $I_{SOL}$ applied to the valve solenoid 202 is 0 (zero), the plunger 203 and the valve body 204 as a single piece receive a biasing force in a downward direction in FIG. 2 by the spring 206, and the valve body 204 is completely seated or mounted on the valve seat 205, then a valve closed state is achieved. In this valve closed state, there is no drain oil amount from the drain port 219, and the pilot pressure $P_P$ from the pilot pressure port 217 is lead to the solenoid pressure port 218 as it is, then the solenoid pressure $P_{SOL}$ becomes a highest pressure (normally high).

On the other hand, when the solenoid current $I_{SOL}$ applied to the valve solenoid 202 becomes large, the plunger 203 and the valve body 204 as a single piece moves upwards in FIG. 2 by a magnetic attraction force against the biasing force of the spring 206, and the valve body 204 separates from the valve seat 205, then a valve open state is achieved. With regard to a valve opening at this time, the higher the magnetic attraction force which is determined by the solenoid current $I_{SOL}$, the larger the valve opening. Then by increasing the drain oil amount from the drain port 219, the solenoid pressure $P_{SOL}$ from the solenoid pressure port 218 decreases. That is, an input/output characteristic of the solenoid current $I_{SOL}$ and the solenoid pressure $P_{SOL}$ shows a characteristic in which the more the solenoid current $I_{SOL}$ is increased, the lower the solenoid pressure $P_{SOL}$.

Figure 3:
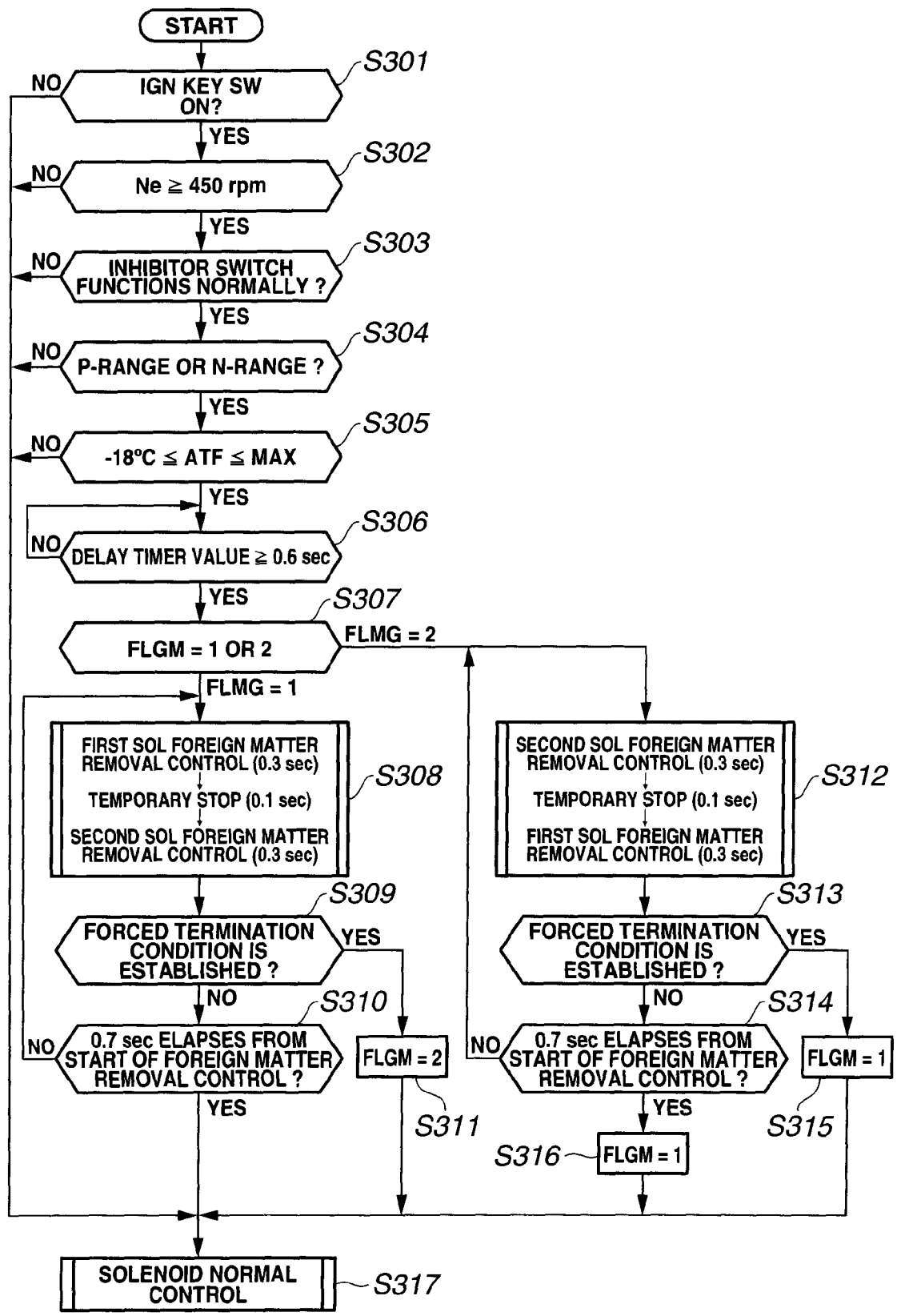
FIG. 3 is a flow chart showing flow of a process of a foreign matter removal control, which is executed in an automatic transmission control unit 5 in the solenoid valve control apparatus.

FIG. 3 is a flow chart showing flow of the foreign matter removal control operation, which is executed in the automatic transmission control unit 5 in the solenoid valve control apparatus. In the following, process of each step (foreign matter removal control means) will be explained.

At step S301, a judgment is made as to whether or not the ignition key switch 6 is ON, through the switch signal from the ignition key switch 6. If YES (the ignition key switch 6 is ON), the routine proceeds to step S302. If NO (the ignition key switch 6 is OFF), the judgment at step S301 is repeated (an oil pressure production condition).

At step S302, subsequent to the judgment of "the ignition key switch 6 is ON" at step S301, a judgment is made as to whether or not an engine rpm Ne detected by the engine rpm sensor 9 is greater than or equal to 450 rpm. If YES (Ne≧450 rpm), the routine proceeds to step S303. If NO (Ne<450 rpm), the routine returns to step S301 (the oil pressure production condition).

That is, by detecting an engine start at step S301 and detecting that the engine rpm reaches an idle rpm range with the engine in a complete explosion condition at step S302, a current condition is checked as to whether the oil pressure that allows the foreign matter removal control can be produced, by a discharged oil from an oil pump driven by the engine.

At step S303, subsequent to the judgment of "the engine rpm Ne is greater than or equal to 450 rpm" at step S302, a judgment is made as to whether or not the inhibitor switch 7 functions normally. If YES (the inhibitor switch 7 functions normally), the routine proceeds to step S304. If NO (the inhibitor switch 7 is in an abnormal condition), the routine returns to step S301 (a vehicle stop condition).

At step S304, subsequent to the judgment of "the inhibitor switch 7 functions normally" at step S303, a judgment is made as to whether a range position that is selected by the switch signal from the inhibitor switch 7 is P-range (parking range) or N-range (neutral range). If YES (P-range or N-range), the routine proceeds to step S305. If NO (ranges except P-range and N-range), the routine returns to step S301 (the vehicle stop condition). That is, by an indication of P-range or N-range of the switch signal from the inhibitor switch 7 that functions normally, the vehicle is judged to be in the stop state.

At step S305, subsequent to the judgment of "the selected range position is P-range or N-range" at step S304, a judgment is made as to whether or not an AT oil temperature ATF satisfies $-18°\,C.\leqq ATF\leqq MAX$, through the sensor signal from the AT oil temperature sensor 8. If YES ($-18°\,C.\leqq ATF\leqq MAX$), the routine proceeds to step S306. If NO ($-18°\,C.>ATF$), the routine returns to step S301 (an oil viscosity propriety condition).

At step S306, subsequent to the judgment of "the AT oil temperature ATF satisfies $-18°\,C.\leqq ATF\leqq MAX$" at step S305, a delay timer is started, and a judgment is made as to whether or not a delay timer value becomes greater than or equal to 0.6 sec. If YES (the delay timer value ≧0.6 sec), the routine proceeds to step S307. If NO (the delay timer value<0.6 sec), the judgment at step S306 is repeated.

At step S307, subsequent to the judgment of "the delay timer value ≧0.6 sec" at step S306, a judgment is made as to whether a first foreign matter removal mode flag FLGM=1 is selected or a second foreign matter removal mode flag FLGM=2 is selected, as a foreign matter removal mode flag FLGM. If FLGM=1 is selected, the routine proceeds to step S308. If FLGM=2 is selected, the routine proceeds to step S312. Here, at an initial setting, as the foreign matter removal mode flag FLGM, the first foreign matter removal mode flag FLGM=1 is set.

At step S308, subsequent to the judgment of "the first foreign matter removal mode flag FLGM=1 is selected" at step S307 or "0.7 sec does not elapse from a start of the foreign matter removal control" at step S310, a first foreign matter removal mode is executed. In this first foreign matter removal mode, a foreign matter removal control (0.3 sec) at the first solenoid valve 21 side is carried out, and a temporary stop (0.1 sec) is executed, then a foreign matter removal control (0.3 sec) at the second solenoid valve 22 side is carried out. That is, the first foreign matter removal mode is formed by the combination of the executions of the foreign matter removal control (0.3 sec) at the first solenoid valve 21 side and the foreign matter removal control (0.3 sec) at the second solenoid valve 22 side through the temporary stop (0.1 sec). The routine proceeds to step S309 while maintaining the execution of the first foreign matter removal mode.

At step S309, subsequent to the execution of the first foreign matter removal mode at step S308, a judgment is made as to whether or not a forced termination condition is established. If YES (the forced termination condition is established), the routine proceeds to step S311. If NO (the forced termination condition is not established), the routine proceeds to step S310.

Here, when the execution of the first foreign matter removal mode is started at step S308, the judgments of a switch-ON condition (step S301), an engine rpm condition (step S302), an inhibitor switch normalcy condition (step S303), a range position condition (step S304) and an AT oil temperature condition (step S305), which are control start conditions, are repeated again. Then, if any one of these conditions is not established or is not satisfied, the forced termination condition is judged to be established.

At step S310, subsequent to the judgment of "the forced termination condition is not established" at step S309, a judgment is made as to whether or not 0.7 sec elapses from the start of the foreign matter removal control at step S308. If YES (0.7 sec elapses from the start of the foreign matter removal control), the routine proceeds to step S317. If NO (0.7 sec does not elapse from the start of the foreign matter removal control), the routine returns to step S308.

At step S311, subsequent to the judgment of "the forced termination condition is established" at step S309, the foreign matter removal mode flag FLGM is changed from "the first foreign matter removal mode flag FLGM=1" to "the second foreign matter removal mode flag FLGM=2", then the routine proceeds to step S317.

At step S312, subsequent to the judgment of "the second foreign matter removal mode flag FLGM=2 is selected" at step S307 or "0.7 sec does not elapse from a start of the foreign matter removal control" at step S314, a second foreign matter removal mode is executed. In this second foreign matter removal mode, a foreign matter removal control (0.3 sec) at the second solenoid valve 22 side is carried out, and a temporary stop (0.1 sec) is executed, then a foreign matter removal control (0.3 sec) at the first solenoid valve 21 side is carried out. That is, the second foreign matter removal mode is formed by the combination of the executions of the foreign matter removal control (0.3 sec) at the second solenoid valve 22 side and the foreign matter removal control (0.3 sec) at the first solenoid valve 21 side through the temporary stop (0.1 sec). The routine proceeds to step S313 while maintaining the execution of the second foreign matter removal mode.

At step S313, subsequent to the execution of the second foreign matter removal mode at step S312, a judgment is made as to whether or not a forced termination condition is established. If YES (the forced termination condition is established), the routine proceeds to step S315. If NO (the forced termination condition is not established), the routine proceeds to step S314.

Here, when the execution of the second foreign matter removal mode is started at step S312, the judgments of the switch-ON condition (step S301), the engine rpm condition (step S302), the inhibitor switch normalcy condition (step S303), the range position condition (step S304) and the AT oil temperature condition (step S305), which are the control start conditions, are repeated again. Then, if any one of these conditions is not established or is not satisfied, the forced termination condition is judged to be established.

At step S314, subsequent to the judgment of "the forced termination condition is not established" at step S313, a judgment is made as to whether or not 0.7 sec elapses from the start of the foreign matter removal control at step S312. If YES (0.7 sec elapses from the start of the foreign matter removal control), the routine proceeds to step S316. If NO (0.7 sec does not elapse from the start of the foreign matter removal control), the routine returns to step S312.

At step S315, subsequent to the judgment of "the forced termination condition is established" at step S313, the foreign matter removal mode flag FLGM is changed from "the second foreign matter removal mode flag FLGM=2" to "the first foreign matter removal mode flag FLGM=1", then the routine proceeds to step S317.

At step S316, subsequent to the judgment of "0.7 sec elapses from the start of the foreign matter removal control" at step S314, the foreign matter removal mode flag FLGM is changed from "the second foreign matter removal mode flag FLGM=2" to "the first foreign matter removal mode flag FLGM=1", then the routine proceeds to step S317.

At step S317, subsequent to the judgment of "0.7 sec elapses from the start of the foreign matter removal control" at step S310 or the change to FLGM=2 at step S311 or the change to FLGM=1 at step S315 or S316, a solenoid normal control is executed. In this normal control, a duty ratio that attains a desired target current is calculated, and a high frequency driving current by a duty command value of a specified frequency (800 Hz) is applied to solenoid coils of the valve solenoids 202 of the first and second solenoid valves 21 and 22.

Next, operation of the present invention will be explained. First, [a mechanism of occurrence of a striking sound in the valve that operates (or works) with the solenoid pressure being the operation (or working) signal pressure] will be explained. Subsequently, with regard to the operation in the solenoid valve control apparatus of the embodiment 1, [an operation of the foreign matter removal control by an establishment of a time termination condition] and [an operation of the foreign matter removal s control by an establishment of a forced termination condition] will be explained below.

[A Mechanism of Occurrence of the Striking Sound in the Valve that Operates with the Solenoid Pressure being the Operation Signal Pressure]

Figure 4:
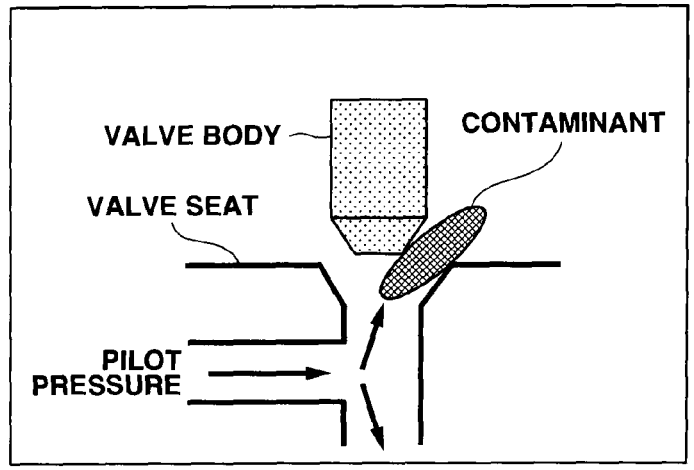
FIG. 4 is a drawing that explains a contamination mode in which contaminant, as a foreign matter, becomes trapped at a valve open/close portion of the linear solenoid valve.
Figure 5:
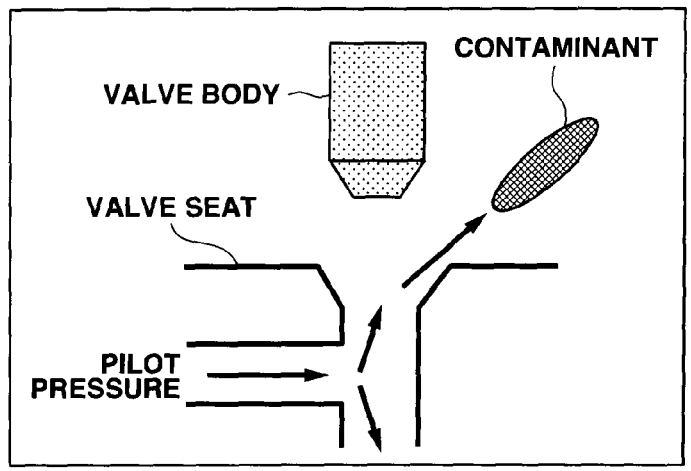
FIG. 5 is a drawing that explains a contamination removal mode in which the contaminant, as the foreign matter, trapped at the valve open/close portion is removed.
Figure 6:
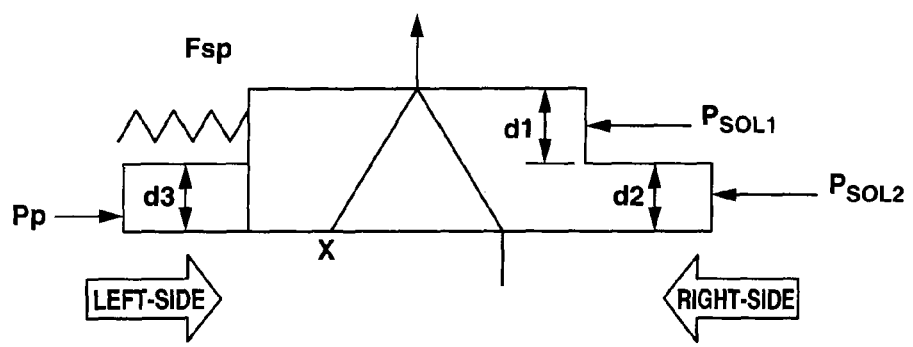
FIG. 6 is a drawing that explains a balance between a left acting force and a right acting force inside a switching valve that works with solenoid pressures from the two linear solenoid valves being working signal pressures.
Figure 7:
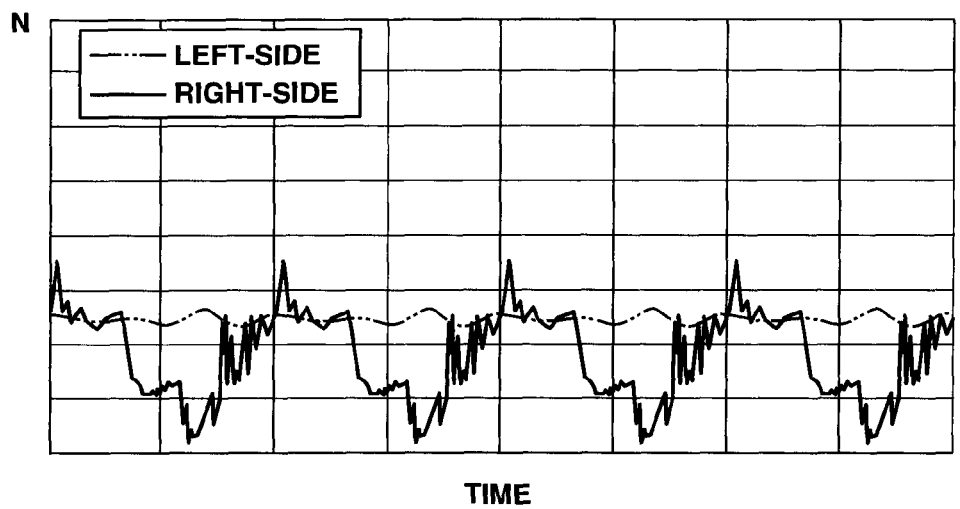
FIG. 7 is a time chart showing change of the left acting force and the right acting force in a case where the foreign matter removal control is executed by a simultaneous drive of the two linear solenoid valves.
Figure 8:
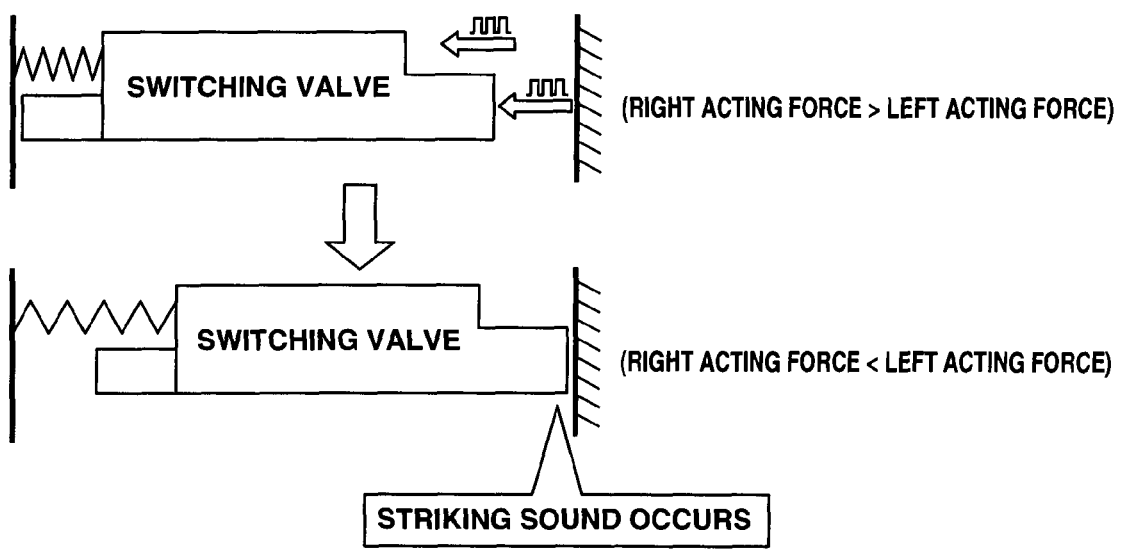
FIG. 8 is a drawing of explanation of a spool action that shows an occurrence of a striking sound, caused by the spool action of the switching valve, in the case where the foreign matter removal control is executed by the simultaneous drive of the two linear solenoid valves.

FIG. 4 is a drawing that explains a contamination mode in which contaminant, as the foreign matter, becomes trapped at the valve open/close portion of the linear solenoid valve. FIG. 5 is a drawing that explains a contamination removal mode in which the contaminant, as the foreign matter, trapped at the valve open/close portion is removed. FIG. 6 is a drawing that explains a balance between a left acting force and a right acting force inside the switching valve that works with solenoid pressures from the two linear solenoid valves being working signal pressures. FIG. 7 is a time chart showing change of the left acting force and the right acting force in a case where the foreign matter removal control is executed by a simultaneous drive of the two linear solenoid valves. FIG. 8 is a drawing of explanation of a spool action that shows the occurrence of the striking sound, caused by the spool action of the switching valve, in the case where the foreign matter removal control is executed by the simultaneous drive of the two linear solenoid valves.

For example, in a case of the normally high two-way linear solenoid valve that outputs the high pressure with the valve closed when the solenoid current applied to the solenoid coil is 0 (zero), as shown in FIG. 4, the contaminant (foreign matter) is apt to become trapped between the valve body and the valve seat inside the valve. The reason why the contaminant is apt to become trapped is that the solenoid current applied to the solenoid coil is the high-frequency driving current and oil pulsates at the valve open/close portion then the oil accumulates or builds up there with the valve closed when the solenoid current is 0 (zero).

When the contaminant (foreign matter) becomes trapped between the valve body and the valve seat and the contamination mode arises, the provided pilot pressure is drained via a gap formed by the trap of the contaminant (foreign matter) between the valve body and the valve seat. As a consequence, a phenomenon in which the solenoid pressure becomes 0 (zero) occurs. Thus, there is a need to remove the contaminant instantly and return an oil pressure regulating function of the linear solenoid valve to a normal state.

For this problem, in JP2005-54970, the solenoid valve control apparatus, to efficiently remove the contaminant that becomes trapped at the valve open/close portion of the linear solenoid valve, has been proposed. More specifically, in JP2005-54970, as the solenoid current applied to the solenoid coil, the rectangular-wave current by which maximum and minimum values of the current command value are alternately repeated is applied (for instance, a driving frequency 50 Hz, a duty driving current of a command current 0.5 A), and this results in the reciprocating movement of the valve body as shown in FIG. 5. Then by widening the opening between the valve body and the valve seat, the contaminant (foreign matter) is drained into the drain port together with oil (the pilot pressure) that flows by this opening action.

However, in the conventional solenoid valve control apparatus, upon execution of the foreign matter removal control, the rectangular-wave current of low frequency by which the maximum current value and the minimum current value are alternately repeated is applied, and the gap or space between the valve seat and the valve body becomes larger than that of the normal control, then the foreign matter that adheres to the valve open/close portion is removed. For this reason, as shown in FIG. 6, in the case where the switching valve that works with the solenoid pressures $P_{SOL1}$ and $P_{SOL2}$ from the two linear solenoid valves being the working signal pressures is used in the solenoid valve control apparatus, upon the foreign matter removal control by the simultaneous drive of the two linear solenoid valves, since the solenoid pressures $P_{SOL1}$ and $P_{SOL2}$ pulsate large, the spool of the switching valve repeatedly strikes or hits against the right and/or left end surfaces of the valve hole (or slot). This phenomenon will be explained below.

First, the force acting on the left side of the spool of the switching valve is, as shown in FIG. 6, represented by the following expression.

$$\text{left acting force} = d3^2 \times \pi/4 \times P_P + F_{SP}$$

On the other hand, the force acting on the right side of the spool of the switching valve is, as shown in FIG. 6, represented by the following expression.

$$\text{right acting force} = (d1^2 - d2^2) \times \pi/4 \times P_{SOL1} + d2^2 \times \pi/4 \times P_{SOL2}$$

That is, at the spool valve of the switching valve, the following expression (1) of balance is established.

$$d3^2 \times \pi/4 \times P_P + F_{SP} = (d1^2 - d2^2) \times \pi/4 \times P_{SOL1} + d2^2 \times \pi/4 \times P_{SOL2} \quad (1)$$

In this balance expression (1), since there is little change in a pilot pressure $P_P$ and a spring force $F_{SP}$, the left acting force only slightly varies. However, as for the right acting force on the right-hand side of the expression, due to the foreign matter removal control with the large pulsation, the solenoid pressures $P_{SOL1}$ and $P_{SOL2}$ vary widely. Then when the solenoid pressures $P_{SOL1}$ and $P_{SOL2}$ become small (low) pressure by a synergistic effect, the expression is represented as follows.

$$d3^2 \times \pi/4 \times P_P + F_{SP} > (d1^2 - d2^2) \times \pi/4 \times P_{SOL1} + d2^2 \times \pi/4 \times P_{SOL2} \quad (1')$$

Furthermore, when the solenoid pressures $P_{SOL1}$ and $P_{SOL2}$ become large (high) pressure by the synergistic effect, the expression is represented as follows.

$$d3^2 \times \pi/4 \times P_P + F_{SP} < (d1^2 - d2^2) \times \pi/4 \times P_{SOL1} + d2^2 \times \pi/4 \times P_{SOL2} \quad (1'')$$

That is to say, in the case where the foreign matter removal control is executed by the simultaneous drive of the two linear solenoid valves, as shown in FIG. 7, the left acting force shown by a two-dot chain line shifts or varies at a small range. Meanwhile, the right acting force shown by a solid line shifts or varies at a large range, and further crosses the line of the left acting force at a plurality of points. That is, when a relation of the right acting force> the left acting force is established, as shown in an upper drawing in FIG. 8, the spool of the switching valve is pushed or pressed against the left side valve hole end surface. When a relation of the right acting force<the left acting force is established, as shown in a lower drawing in FIG. 8, the spool of the switching valve is pushed or pressed against the right side valve hole end surface.

Therefore, when the spool that is positioned apart from the right side valve hole end surface strikes against or touches the right side valve hole end surface strongly, the striking sound occurs. This striking sound is not obtrusive under cover of other noises when the vehicle is in a traveling state. However, the foreign matter removal control operation is normally performed as the initialization operation at the engine start with the vehicle in the stop state. Because of this, when the striking sound of the spool occurs in a low noise atmosphere, occupants in the vehicle feel or hear this striking sound as noises.

[An Operation of the Foreign Matter Removal Control by an Establishment of a Time Termination Condition]

Figure 9:
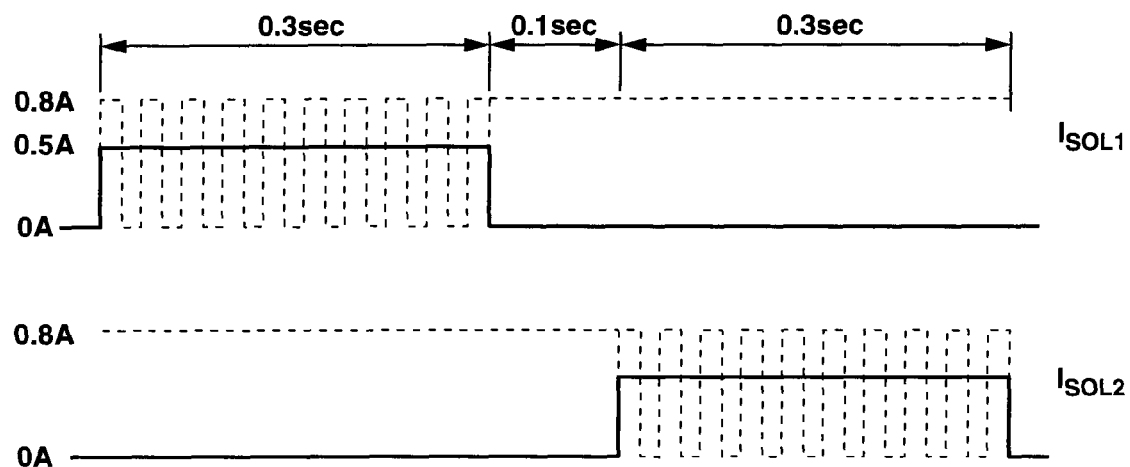
FIG. 9 is a driving current characteristic that shows a first solenoid current and a second solenoid current in a first foreign matter removal mode in the solenoid valve control apparatus of the embodiment 1.
Figure 10:
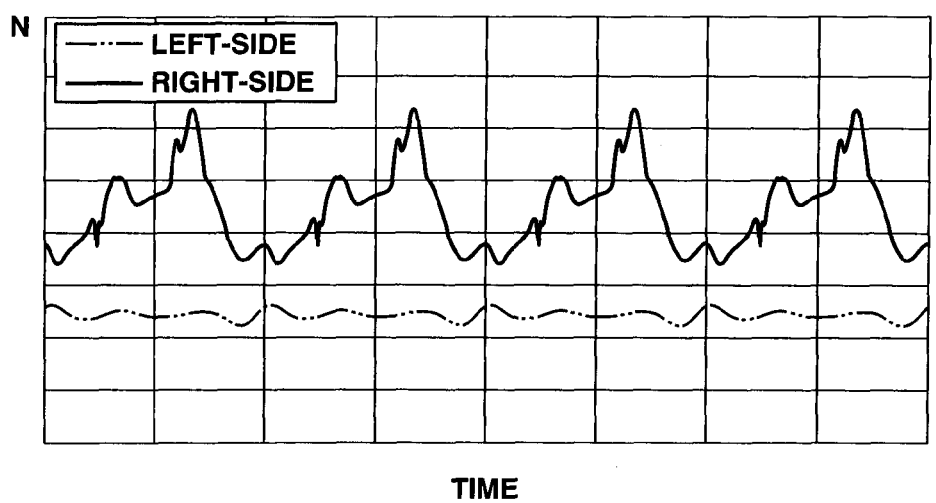
FIG. 10 is a time chart showing change of the left acting force and the right acting force in a case where the foreign matter removal control is executed at the first solenoid valve side.
Figure 11:
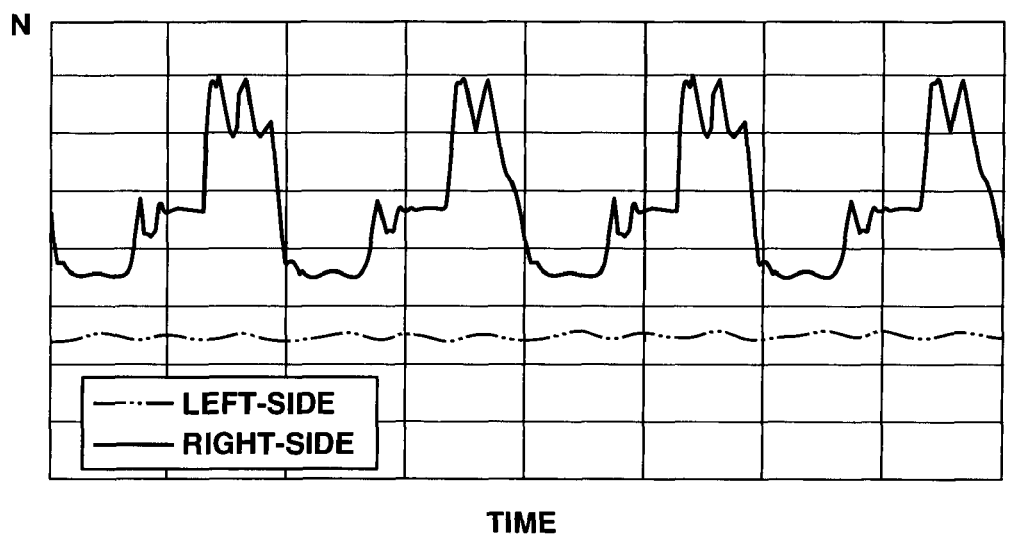
FIG. 11 is a time chart showing change of the left acting force and the right acting force in a case where the foreign matter removal control is executed at the second solenoid valve side.
Figure 12:
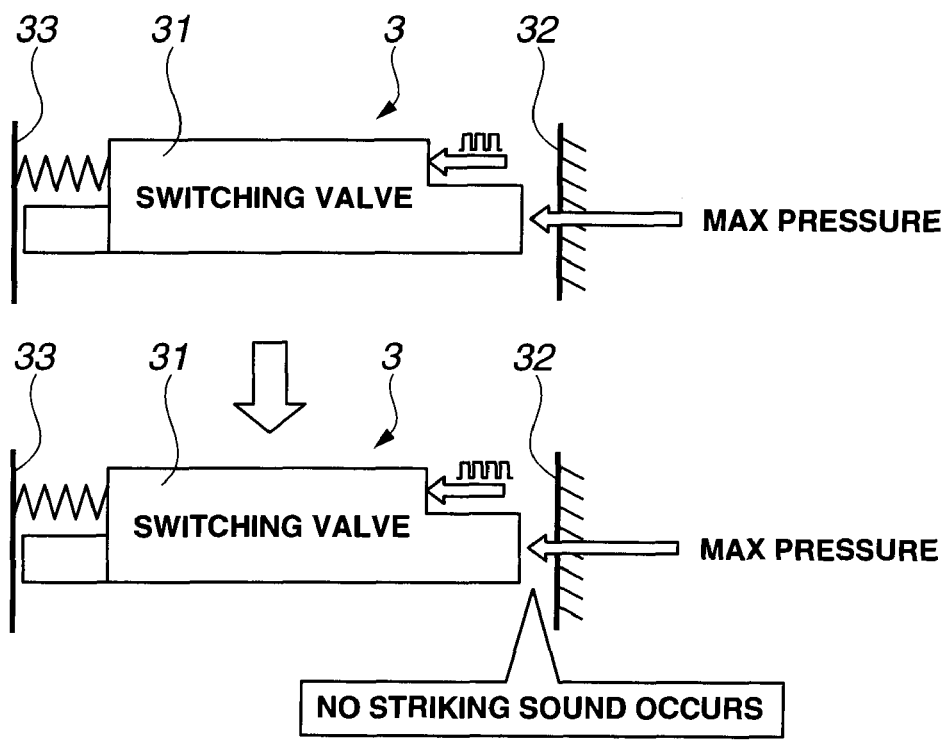
FIG. 12 is a drawing of explanation of the spool action that shows no occurrence of the striking sound in the switching valve, in a case where the foreign matter removal control is executed at one linear solenoid valve of the two linear solenoid valves and a maximum pressure backup control is executed at the other linear solenoid valve.

FIG. 9 is a driving current characteristic that shows the first solenoid current and the second solenoid current in the first foreign matter removal mode in the solenoid valve control apparatus of the embodiment 1. FIG. 10 is a time chart showing change of the left acting force and the right acting force in a case where the foreign matter removal control is executed at the first solenoid valve side. FIG. 11 is a time chart showing change of the left acting force and the right acting force in a case where the foreign matter removal control is executed at the second solenoid valve side. FIG. 12 is a drawing of explanation of the spool action that shows no occurrence of the striking sound in the switching valve, in a case where the foreign matter removal control is executed at one linear solenoid valve of the two linear solenoid valves and a maximum pressure backup control is executed at the other linear solenoid valve.

When the foreign matter removal mode flag FLGM is the first foreign matter removal mode flag FLGM=1 by the establishment of the time termination condition and all of each start condition of the foreign matter removal control are established, in the flow chart in FIG. 3, the routine proceeds to step S301→S302→S303→S304→S305→S306, and at step S306, the delay timer is started, and the judgment is made as to whether or not the delay timer value becomes greater than or equal to 0.6 sec. And when the delay timer value becomes greater than or equal to 0.6 sec, the routine proceeds to step S307→S308→S309→S310 from step S306. Then, the flow of step S308→S309→S310 is repeated until 0.7 sec passes from the start of the foreign matter removal control as long as the forced termination condition is not established, and at step S308, the first foreign matter removal mode is executed by the combination of the executions of the foreign matter removal control at the first solenoid valve 21 side and the foreign matter removal control at the second solenoid valve 22 side through the temporary stop.

That is, as shown in a first solenoid current characteristic in FIG. 9, for a time until a first setting time (0.3 sec) elapses from the start of the first foreign matter removal mode, the foreign matter removal control is executed at the first solenoid valve 21, in which a rectangular-wave current that performs the reciprocating movement of the plunger 203, i.e. a duty driving current by which a maximum current command value 0.8 A and a minimum current command value 0 A are alternately repeated at a driving frequency 50 Hz and a command current 0.5 A is applied to the coil of the valve solenoid 202 of the first solenoid valve 21. At the same time as this execution of the foreign matter removal control, as shown in a second solenoid current characteristic in FIG. 9, the maximum pressure backup control is executed at the second solenoid valve 22, in which zero current (=0 A) is applied to the coil of the valve solenoid 202 of the second solenoid valve 22.

Subsequently, for a time until a second setting time (0.1 sec) elapses from the elapsed time (point) of the first setting time, as shown in the first and second solenoid current characteristics in FIG. 9, by applying the zero current (=0 A) to the solenoid coils 202 of the both first and second solenoid valves 21 and 22, the foreign matter removal control is temporarily stopped. This temporary stop serves to wait for convergence of the pulsation of the oil pressure.

Subsequently, for a time until a third setting time (0.3 sec) elapses from the elapsed time (point) of the second setting time, as shown in the second solenoid current characteristic in FIG. 9, the foreign matter removal control is executed at the second solenoid valve 22, in which the rectangular-wave current that performs the reciprocating movement of the plunger 203, i.e. the duty driving current by which the maximum current command value 0.8 A and the minimum current command value 0 A are alternately repeated at the driving frequency 50 Hz and the command current 0.5 A is applied to the coil of the valve solenoid 202 of the second solenoid valve 22. At the same time as this execution of the foreign matter removal control, as shown in the first solenoid current characteristic in FIG. 9, the maximum pressure backup control is executed at the first solenoid valve 21, in which zero current (=0 A) is applied to the coil of the valve solenoid 202 of the first solenoid valve 21.

Then, at step S310, when 0.7 sec, which is a total time of the first setting time (0.3 sec), second setting time (0.1 sec) and the third setting time (0.3 sec) from the start of the foreign matter removal control by the first foreign matter removal mode at step S308, elapses, the routine proceeds to step S317 from step S310, and at step s317, the control shifts to the solenoid normal control.

As described above, in the foreign matter removal control by the establishment of the time termination condition, when the rectangular-wave current that removes the foreign matter is applied to the valve solenoid 202 of the first solenoid valve 21, the current application (=0 A) to the valve solenoid 202 of the second solenoid valve 22, by which the second solenoid pressure $P_{SOL2}$ becomes a maximum pressure (=the pilot pressure $P_P$), is maintained. Consequently, even if the first solenoid pressure $P_{SOL1}$ varies due to the application of the rectangular-wave current, the relation of the following expression (1″) is maintained.

$$d3^2 \times \pi/4 \times P_P + F_{SP} < (d1^2 - d2^2) \times \pi/4 \times P_{SOL1} + d2^2 \times \pi/4 \times P_{SOL2} \quad (1'')$$

Hence, in the case where only the first solenoid valve 21 is driven through the application of the rectangular-wave current, as shown in FIG. 10, while the left acting force shown by the two-dot chain line shifts or varies at the small range, the right acting force shown by the solid line shifts or varies large only in an upper region of the characteristic of the left acting force.

In addition, when the rectangular-wave current that removes the foreign matter is applied to the valve solenoid 202 of the second solenoid valve 22, the current application (=0 A) to the valve solenoid 202 of the first solenoid valve 21, by which the first solenoid pressure $P_{SOL1}$ becomes a maximum pressure (=the pilot pressure $P_P$), is maintained. Consequently, even if the second solenoid pressure $P_{SOL2}$ varies due to the application of the rectangular-wave current, the relation of the following expression (1″) is maintained.

$$d3^2 \times \pi/4 \times P_P + F_{SP} < (d1^2 - d2^2) \times \pi/4 \times P_{SOL1} + d2^2 \times \pi/4 \times P_{SOL2} \quad (1'')$$

Hence, in the case where only the second solenoid valve 22 is driven through the application of the rectangular-wave current, as shown in FIG. 11, while the left acting force shown by the two-dot chain line shifts or varies at the small range, the right acting force shown by the solid line shifts or varies large only in an upper region of the characteristic of the left acting force.

And, for instance, upon the foreign matter removal control of the first solenoid valve 21, on the first solenoid valve 21 side, by performing the reciprocating movement of the plunger 203 through the great pulsation of the oil, the foreign matter that adheres to the valve open/close portion is pulled away, then the foreign matter is efficiently removed. Meanwhile, on the second solenoid valve 22 side, by executing the backup control that outputs the second solenoid pressure $P_{SOL2}$ of the maximum pressure, the relation of the right acting force>the left acting force is maintained.

As a consequence, as shown in an upper drawing in FIG. 12, when the first solenoid pressure $P_{SOL1}$ is low pressure, the spool 31 of the switching valve 3 is pushed or pressed against left side valve hole end surface 33. As shown in a lower drawing in FIG. 12, also when the first solenoid pressure $P_{SOL1}$ is high pressure, the spool 31 of the switching valve 3 is pushed or pressed against the left side valve hole end surface 33. It is therefore possible to prevent the occurrence of the striking sound in the switching valve 3.

Likewise, upon the foreign matter removal control of the second solenoid valve 22, the same actions as the above foreign matter removal control of the first solenoid valve 21 are performed. Then, irrespective of the pressure as to whether the low pressure or the high pressure of the second solenoid pressure $P_{SOL2}$, by pushing or pressing the spool 31 of the switching valve 3 against the left side valve hole end surface 33, the occurrence of the striking sound in the switching valve 3 can be prevented.

[An Operation of the Foreign Matter Removal Control by an Establishment of a Forced Termination Condition]

Figure 13:
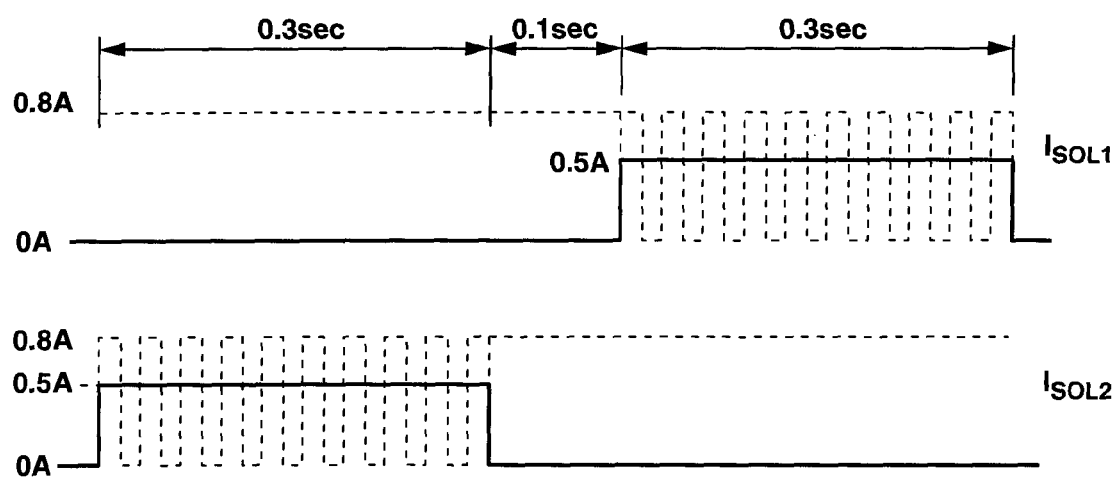
FIG. 13 is a driving current characteristic that shows a first solenoid current and a second solenoid current in a second foreign matter removal mode in the solenoid valve control apparatus of the embodiment 1.

FIG. 13 is a driving current characteristic that shows the first solenoid current and the second solenoid current in the second foreign matter removal mode in the solenoid valve control apparatus of the embodiment 1.

During the progress of the execution of the foreign matter removal control by the above first foreign matter removal mode, for instance, when the range position is changed from N-range to D-range then the forced termination condition is established, in the flow chart in FIG. 3, the routine proceeds to step S308→S309→S311→S317, and at step S311, the foreign matter removal mode flag FLGM is changed from "the first foreign matter removal mode flag FLGM=1" to "the second foreign matter removal mode flag FLGM=2".

Thus, when all of each start condition of the foreign matter removal control are established at the next execution, in the flow chart in FIG. 3, the routine proceeds to step S301→S302→S303→S304→S305→S306, and at step S306, the delay timer is started, and the judgment is made as to whether or not the delay timer value becomes greater than or equal to 0.6 sec. And when the delay timer value becomes greater than or equal to 0.6 sec, the routine proceeds to step S307→S312→S313→S314 from step S306. Then, the flow of step S312→S313→S314 is repeated until 0.7 sec passes from the start of the foreign matter removal control as long as the forced termination condition is not established, and at step S312, the second foreign matter removal mode is executed by the combination of the executions of the foreign matter removal control at the second solenoid valve 22 side and the foreign matter removal control at the first solenoid valve 21 side through the temporary stop.

That is, as shown in a second solenoid current characteristic in FIG. 13, for a time until a first setting time (0.3 sec) elapses from the start of the second foreign matter removal mode, the foreign matter removal control is executed at the second solenoid valve 22, in which the rectangular-wave current that performs the reciprocating movement of the plunger 203, i.e. the duty driving current by which the maximum current command value 0.8 A and the minimum current command value 0 A are alternately repeated at the driving frequency 50 Hz and the command current 0.5 A is applied to the coil of the valve solenoid 202 of the second solenoid valve 22. At the same time as this execution of the foreign matter removal control, as shown in a first solenoid current characteristic in FIG. 13, the maximum pressure backup control is executed at the first solenoid valve 21, in which zero current (=0 A) is applied to the coil of the valve solenoid 202 of the first solenoid valve 21.

Subsequently, for a time until a second setting time (0.1 sec) elapses from the elapsed time (point) of the first setting time, as shown in the first and second solenoid current characteristics in FIG. 13, by applying the zero current (=0 A) to the solenoid coils 202 of the both first and second solenoid valves 21 and 22, the foreign matter removal control is temporarily stopped. This temporary stop serves to wait for convergence of the pulsation of the oil pressure.

Subsequently, for a time until a third setting time (0.3 sec) elapses from the elapsed time (point) of the second setting time, as shown in the first solenoid current characteristic in FIG. 13, the foreign matter removal control is executed at the first solenoid valve 21, in which the rectangular-wave current that performs the reciprocating movement of the plunger 203, i.e. the duty driving current by which the maximum current command value 0.8 A and the minimum current command value 0 A are alternately repeated at the driving frequency 50 Hz and the command current 0.5 A is applied to the coil of the valve solenoid 202 of the first solenoid valve 21. At the same time as this execution of the foreign matter removal control, as shown in the second solenoid current characteristic in FIG. 13, the maximum pressure backup control is executed at the second solenoid valve 22, in which zero current (=0 A) is applied to the coil of the valve solenoid 202 of the second solenoid valve 22.

Then, at step S314, when 0.7 sec, which is a total time of the first setting time (0.3 sec), the second setting time (0.1 sec) and the third setting time (0.3 sec) from the start of the foreign matter removal control by the second foreign matter removal mode at step S312, elapses, the routine proceeds to step S316 from step S314 and the foreign matter removal mode flag FLGM is changed from "the second foreign matter removal mode flag FLGM=2" to "the first foreign matter removal mode flag FLGM=1", and further proceeds to step S317, then the control shifts to the solenoid normal control.

In addition, during the progress of the execution of the foreign matter removal control by the above second foreign matter removal mode, for instance, when the range position is changed from N-range to D-range then the forced termination condition is established, in the flow chart in FIG. 3, the routine proceeds to step S312→S313→S315, and at step S315, the foreign matter removal mode flag FLGM is changed from "the second foreign matter removal mode flag FLGM=2" to "the first foreign matter removal mode flag FLGM=1".

As described above, in the solenoid valve control apparatus, when the forced termination condition is established during the progress of the execution of the foreign matter removal control by the first foreign matter removal mode, the foreign matter removal control by the second foreign matter removal mode is executed next. Likewise, when the forced termination condition is established during the progress of the execution of the foreign matter removal control by the second foreign matter removal mode, the foreign matter removal control by the first foreign matter removal mode is executed next.

Accordingly, for example, in a case where, although the foreign matter removal control of only the first solenoid valve 21 by the first foreign matter removal mode is executed, the foreign matter removal control of the second solenoid valve 22 is not executed yet due to the forced termination, by selecting the second foreign matter removal mode at the next foreign matter removal control, it is possible that the not-yet-executed foreign matter removal control of the second solenoid valve 22 comes first (it is possible that the not-yet-executed foreign matter removal control of the second solenoid valve 22 takes precedence over the foreign matter removal control of the first solenoid valve 21).

Likewise, for example, in a case where, although the foreign matter removal control of only the second solenoid valve 22 by the second foreign matter removal mode is executed, the foreign matter removal control of the first solenoid valve 21 is not executed yet due to the forced termination, by selecting the first foreign matter removal mode at the next foreign matter removal control, it is possible that the not-yet-executed foreign matter removal control of the first solenoid valve 21 comes first (it is possible that the not-yet-executed foreign matter removal control of the first solenoid valve 21 takes precedence over the foreign matter removal control of the second solenoid valve 22).

As explained above, in the case where the forced termination condition is established, the foreign matter removal control of the solenoid valve which has a strong possibility of non-execution at this time, comes first (or performed first) at the next foreign matter removal control. Hence, for instance, even when the forced termination arises successively, it is possible to prevent a situation in which only the foreign matter removal control of the first solenoid valve 21 is executed and the foreign matter removal control of the second solenoid valve 22 is not executed on several occasions, and this can ensure the execution of the foreign matter removal control for the two first and second solenoid valves 21 and 22.

Next, effects of the present invention will be explained. In the solenoid valve control apparatus of the embodiment 1, the following effects can be obtained.

(1) A solenoid valve control apparatus includes a solenoid valve (2) having (a) a first solenoid valve (21) that outputs a first solenoid pressure ($P_{SOL1}$), (b) a second solenoid valve (22) that outputs a second solenoid pressure ($P_{SOL2}$), each of the first and second solenoid valves (21, 22) having a solenoid coil (202) that drives a plunger (203) inside the solenoid valve (2) in accordance with an application current ($I_{SOL}$), the plunger (203) controlling communication between a solenoid pressure port (218) and a drain port (219), a pressure regulation valve (the switching valve 3) that works with the first and second solenoid pressures ($P_{SOL1}$, $P_{SOL2}$) from the solenoid valve (2) being working signal pressures of a spool (31), and a foreign matter removal control means (FIG. 3) that removes a foreign matter that adheres to a valve open/close portion of the solenoid valve (2), by applying a rectangular-wave current which performs a reciprocating movement of the plunger (203) to the solenoid coil (202), upon execution of a foreign matter removal control. The foreign matter removal control means (FIG. 3) is configured so that when applying the rectangular-wave current, which removes the foreign matter, to the solenoid coil (202) of one solenoid valve of the first and second solenoid valves (21, 22), a current application to the solenoid coil (202) of the other solenoid valve, by which the solenoid pressure ($P_{SOL}$) becomes a maximum pressure range, is maintained. Accordingly, by executing the backup control for one valve of the both solenoid valves 21, 22 in liaison with the foreign matter removal control for the other valve upon the execution of the foreign matter removal control, the occurrence of the striking sound in the pressure regulation valve (the switching valve 3) can be prevented while efficiently removing the foreign matter.

(2) The spool (31) inside the pressure regulation valve (the switching valve 3) receives a first spool acting force (left acting force) from one end side of the spool (31), and also receives a second spool acting force (right acting force) from the other end side of the spool (31) through the first and second solenoid pressures ($P_{SOL1}$, $P_{SOL2}$) against the first spool acting force (left acting force), and the foreign matter removal control means (FIG. 3) is configured to push the spool (31) against the one end side by the second spool acting force (right acting force) which exceeds the first spool acting force (left acting force), upon the execution of the foreign matter removal control.

Consequently, the foreign matter removal control of the first and second solenoid valves 21 and 22 can be performed without occurrence of the striking sound while maintaining the state in which the spool 31 of the pressure regulation valve (the switching valve 3) is pushed or pressed against one end side.

(3) The foreign matter removal control means (FIG. 3) is configured to perform a maximum pressure range backup control for the other solenoid valve of the first and second solenoid valves (21, 22) at the same time as the foreign matter removal control for the one solenoid valve, and to temporarily stop the foreign matter removal control for the both first and second solenoid valves (21, 22), then to perform the maximum pressure range backup control for the one solenoid valve at the same time as the foreign matter removal control for the other solenoid valve, after a start condition of the foreign matter removal control is established.

As a consequence, the foreign matter removal control of the first and second solenoid valves 21 and 22 can be performed successively and systematically while suppressing the pulsation of the oil pressure by the temporary stop of the foreign matter removal control.

(4) The foreign matter removal control means (FIG. 3) is configured so that when a setting time elapses from establishment of all conditions of an oil pressure production condition (steps S301, S302), a vehicle stop condition (steps S303, S304) and an oil viscosity propriety condition (step S305), a control start condition is judged to be established (YES at step S306), then the foreign matter removal control is started.

For this reason, the foreign matter removal control can be started under the optimum condition where operation and effects of the foreign matter removal are secured by the establishment of the oil pressure production condition and the oil viscosity propriety condition without affecting the normal control by the establishment of the vehicle stop condition.

(5) The foreign matter removal control means (FIG. 3) is configured so that a foreign matter removal control time is set as a total time of the following setting times; (a) a first setting time (0.3 sec) for which a maximum pressure range backup control for the other solenoid valve of the first and second solenoid valves (21, 22) is performed at the same time as the foreign matter removal control for the one solenoid valve; (b) a second setting time (0.1 sec) for which the foreign matter removal control for the both first and second solenoid valves (21, 22) is temporarily stopped; and (c) a third setting time (0.3 sec) for which the maximum pressure range backup control for the one solenoid valve is performed at the same time as the foreign matter removal control for the other solenoid valve, and when the foreign matter removal control time elapses from a start of the control, a time termination condition is judged to be established (YES at step S310 or S314), then the foreign matter removal control is terminated. Thus, since the foreign matter removal control of the first and second solenoid valves 21 and 22 is terminated when the times required for the two foreign matter removal controls and the time required for the temporary stop elapse, the foreign matter removal control can be completed in a short time. Here, since it has been found out that the oil pressure comes up or is ready for operation in 0.035 sec from the start of the foreign matter removal control, 0.3 sec is a sufficient time as a time for the execution of the effective foreign matter removal. Furthermore, since it has been found out that the oil pulsation due to the foreign matter removal control converges in about 0.1 sec, 0.1 sec is an adequate or reasonable time as a time of the temporary stop, for the sake of terminating the control in the short time.

(6) The foreign matter removal control means (FIG. 3) is configured so that a judgment of each condition of an oil pressure production condition (steps S301, S302), a vehicle stop condition (steps S303, S304) and an oil viscosity propriety condition (step S305) is made in parallel with the execution of the foreign matter removal control after starting the foreign matter removal control, and when any one of these conditions is not satisfied by the time when the time termination condition is established, a forced termination condition is judged to be established, then a forced termination of the foreign matter removal control is executed (YES at step S309 or S313).

Therefore, in the case where the control optimum condition is not satisfied during the foreign matter removal control, it is possible to prevent a situation in which the foreign matter removal control is continued under the condition where the operation and effects of the foreign matter removal control are not secured. Moreover, the foreign matter removal control is instantly terminated when the control optimum condition is not satisfied. This can avoid a delay in the start of the normal control.

(7) The foreign matter removal control means (FIG. 3) has (a) a first foreign matter removal mode formed by a combination of controls that proceeds from the foreign matter removal control on the first solenoid valve (21) side to the foreign matter removal control on the second solenoid valve (22) side through the temporary stop; (b) a second foreign matter removal mode formed by a combination of controls that proceeds from the foreign matter removal control on the second solenoid valve (22) side to the foreign matter removal control on the first solenoid valve (21) side through the temporary stop. And in a case where the forced termination is executed during a progress of the execution of the foreign matter removal control performed by the first foreign matter removal mode (YES at step S309), the foreign matter removal control performed by the second foreign matter removal mode is selected next (step S311), and in a case where the forced termination is executed during a progress of the execution of the foreign matter removal control performed by the second foreign matter removal mode (YES at step S313), the foreign matter removal control performed by the first foreign matter removal mode is selected next (step S315).

With this operation, it is possible to prevent a situation in which the foreign matter removal control of the solenoid valve which is executed later in a basic foreign matter removal mode is not executed on several occasions, and this can ensure the execution of the foreign matter removal control for the two first and second solenoid valves 21 and 22.

(8) The solenoid valve is a normally high two-way linear solenoid valve (2) which outputs a pilot pressure $P_P$ as it is, as the solenoid pressure ($P_{SOL}$), with the valve closed when the solenoid current ($I_{SOL}$) applied to the solenoid coil (202) is 0 (zero), and decreases the solenoid pressure ($P_{SOL}$) by increasing a drain oil amount with increase in the solenoid current ($I_{SOL}$) applied to the solenoid coil (202), and the foreign matter removal control means (FIG. 3) is configured to set the solenoid current ($I_{SOL}$) applied to the solenoid coil (202) of the normally high two-way linear solenoid valve (2) to 0 (zero) when performing the maximum pressure range backup control of the solenoid valve and when executing the temporary stop of the foreign matter removal control of the both solenoid valves (21, 22) (steps S308, S312).

Consequently, even though the valve is the normally high two-way linear solenoid valve 2 in which the foreign matter is apt to adhere to valve open/close portion, the backup control requires only the maintenance of zero (0 A) of the solenoid current $I_{SOL}$ for the time from the start of the maximum pressure backup control to the end of the temporary stop and/or for the time from the start of the temporary stop to the end of the maximum pressure backup control. Thus, the backup control executed in liaison with the foreign matter removal control can be carried out simply and easily.

(9) The first and second solenoid valves (21, 22) are installed in a valve body (222) of a control valve unit of an automatic transmission, and the pressure regulation valve is a switching valve (3) that changes the valve to a drain side where an engagement element pressure of a frictional engagement element (1) is drained when the first and second solenoid pressures ($P_{SOL1}$, $P_{SOL2}$) of the working signal pressures are supplied to the switching valve (3) from the first and second solenoid valves (21, 22). Because of this, when there is a need to change the valve to the drain side where the engagement element pressure of the frictional engagement element 1 is drained at the shift, it is possible to prevent an occurrence of a situation in which at least one solenoid pressure of the first and second solenoid pressures $P_{SOL1}$ and $P_{SOL2}$ is not supplied due to the adherence of the foreign matter and the engagement element pressure of the frictional engagement element 1 is not drained.

Although the present invention has been described above on the basis of the embodiment 1 and drawings, the invention is not limited to the embodiment 1. Modifications and variations of the embodiment described above will occur to those skilled in the art in light of the above teachings.

In the embodiment 1, as the solenoid valve, the normally high two-way linear solenoid valve is used. However, a normally low two-way linear solenoid valve or other solenoid valves having different valve structure could be used as long as these are solenoid valves that have the contamination mode.

In the embodiment 1, the pressure regulation valve (the switching valve) works with the two solenoid pressures being the working signal pressures and acting on the pressure regulation valve from one direction. However, the two solenoid pressures could act on the pressure regulation valve from different two directions, as the working signal pressures, as long as the spool of the pressure regulation valve can be pushed or pressed against the valve end surface by performing the backup control upon the execution of the foreign matter removal control.

In the embodiment 1, the pressure regulation valve (the switching valve) works with the two solenoid pressures being the working signal pressures. However, three or more solenoid pressures could act on the pressure regulation valve, as the working signal pressures. In this case, the solenoid valves are separated into two groups, as a first solenoid valve and a second solenoid valve.

In the embodiment 1, as the pressure regulation valve, the switching valve is used. However, a hydraulic control or regulation valve that controls an output pressure in accordance with the solenoid pressure, with the solenoid pressure being the working signal pressure, could be used.

In the embodiment 1, the maximum pressure backup control is executed as the backup control upon the execution of the foreign matter removal control. However, this backup control includes a backup control in which the solenoid pressure is not set to the maximum pressure, but to a maximum pressure range or level, as long as this control is a control in which the spool can be pushed or pressed against one end surface side.

In the embodiment 1, the solenoid valve control apparatus is applied to the automatic transmission of the vehicle with the engine. However, the solenoid valve control apparatus of the present invention can be applied to a CVT (continuously variable transmission), a transmission for a hybrid vehicle or a transmission for an electric vehicle and so on. In addition, in a case where this solenoid valve control apparatus is a solenoid valve control apparatus which has a plurality of the solenoid valves and a pressure regulation valve that works with a plurality of the solenoid pressures being working signal pressures of the spool, this apparatus could be applied not only to hydraulic devices installed in the vehicle, but also to other various hydraulic devices or systems.

The entire contents of Japanese Patent Application No. 2008-063467 filed on Mar. 13, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A solenoid valve control apparatus comprising:
a solenoid valve having:
 (a) a first solenoid valve that outputs a first solenoid pressure;
 (b) a second solenoid valve that outputs a second solenoid pressure,
each of the first and second solenoid valves having a solenoid coil that drives a plunger inside the solenoid valve in accordance with an application current, the plunger controlling communication between a solenoid pressure port and a drain port,
a pressure regulation valve that works with the first and second solenoid pressures from the solenoid valve being working signal pressures of a spool; and
a foreign matter removal control means that removes a foreign matter that adheres to a valve open/close portion of the solenoid valve, by applying a rectangular-wave current which performs a reciprocating movement of the plunger to the solenoid coil, upon execution of a foreign matter removal control, and
the foreign matter removal control means being configured so that when applying the rectangular-wave current, which removes the foreign matter, to the solenoid coil of one solenoid valve of the first and second solenoid valves, a current application to the solenoid coil of the other solenoid valve, by which the solenoid pressure becomes a maximum pressure range, is maintained.

2. The solenoid valve control apparatus as claimed in claim 1, wherein:
the spool is inside of the pressure regulation valve and the spool receives a first spool acting force from one end side of the spool, and also receives a second spool acting force from the other end side of the spool through the first and second solenoid pressures against the first spool acting force, and
the foreign matter removal control means is configured to push the spool against the one end side by the second spool acting force which exceeds the first spool acting force, upon the execution of the foreign matter removal control.

3. The solenoid valve control apparatus as claimed in claim 1, wherein:
the foreign matter removal control means is configured to perform a maximum pressure range backup control for the other solenoid valve of the first and second solenoid valves at the same time as the foreign matter removal control for the one solenoid valve, and
to temporarily stop the foreign matter removal control for the both first and second solenoid valves, then
to perform the maximum pressure range backup control for the one solenoid valve at the same time as the foreign matter removal control for the other solenoid valve,
after a start condition of the foreign matter removal control is established.

4. The solenoid valve control apparatus as claimed in claim 1, wherein:
the foreign matter removal control means is configured so that when a setting time elapses from establishment of all conditions of an oil pressure production condition, a vehicle stop condition and an oil viscosity propriety condition, a control start condition is judged to be established, then the foreign matter removal control is started.

5. The solenoid valve control apparatus as claimed in claim 1, wherein:
the foreign matter removal control means is configured so that
a foreign matter removal control time is set as a total time of the following setting times:
 (a) a first setting time for which a maximum pressure range backup control for the other solenoid valve of the first and second solenoid valves is performed at the same time as the foreign matter removal control for the one solenoid valve;
 (b) a second setting time for which the foreign matter removal control for the first and second solenoid valves is temporarily stopped; and
 (c) a third setting time for which the maximum pressure range backup control for the one solenoid valve is performed at the same time as the foreign matter removal control for the other solenoid valve, and
when the foreign matter removal control time elapses from a start of the control, a time termination condition is judged to be established, then the foreign matter removal control is terminated.

6. The solenoid valve control apparatus as claimed in claim 5, wherein:
the foreign matter removal control means is configured so that
a judgment of each condition of an oil pressure production condition, a vehicle stop condition and an oil viscosity propriety condition is made in parallel with the execution of the foreign matter removal control after starting the foreign matter removal control, and
when any one of these conditions is not satisfied by the time when the time termination condition is established, a forced termination condition is judged to be established, then a forced termination of the foreign matter removal control is executed.

7. The solenoid valve control apparatus as claimed in claim 6, wherein:
the foreign matter removal control means has
 (a) a first foreign matter removal mode formed by a combination of controls that proceeds from the foreign matter removal control on the first solenoid valve side to the foreign matter removal control on the second solenoid valve side through the temporary stop;
 (b) a second foreign matter removal mode formed by a combination of controls that proceeds from the foreign matter removal control on the second solenoid valve side to the foreign matter removal control on the first solenoid valve side through the temporary stop, and
in a case where the forced termination is executed during a progress of the execution of the foreign matter removal control performed by the first foreign matter removal mode, the foreign matter removal control performed by the second foreign matter removal mode is selected next, and
in a case where the forced termination is executed during a progress of the execution of the foreign matter removal control performed by the second foreign matter removal mode, the foreign matter removal control performed by the first foreign matter removal mode is selected next.

8. The solenoid valve control apparatus as claimed in claim 3, wherein:
   each solenoid valve of the first and second solenoid valves is a normally high two-way linear solenoid valve which outputs a pilot pressure $P_p$ as it is, as the solenoid pressure, with the valve closed when the solenoid current applied to the solenoid coil is 0 (zero), and decreases the solenoid pressure by increasing a drain oil amount with increase in the solenoid current applied to the solenoid coil, and
   the foreign matter removal control means is configured to set the solenoid current applied to the solenoid coil of the normally high two-way linear solenoid valve to 0 (zero) when performing the maximum pressure range backup control of the each solenoid valve of the first and second solenoid valves and when executing the temporary stop of the foreign matter removal control of the first and second solenoid valves.

9. The solenoid valve control apparatus as claimed in claim 1, wherein:
   the first and second solenoid valves are installed in a valve body of a control valve unit of an automatic transmission, and
   the pressure regulation valve is a switching valve that changes the valve to a drain side where an engagement element pressure of a frictional engagement element is drained when the first and second solenoid pressures of the working signal pressures are supplied to the switching valve from the first and second solenoid valves.

10. A method for controlling a solenoid valve including a first solenoid valve that outputs a first solenoid pressure and a second solenoid valve that outputs a second solenoid pressure, each of the first and second solenoid valves having a solenoid coil that drives a plunger inside the solenoid valve in accordance with an application current, the plunger controlling communication between a solenoid pressure port and a drain port, the method comprising:
   when applying a rectangular-wave current, which performs a reciprocating movement of the plunger and removes a foreign matter that adheres to a valve open/close portion of the solenoid valve, to the solenoid coil of one solenoid valve of the first and second solenoid valves, maintaining a current application to the solenoid coil of the other solenoid valve, by which the solenoid pressure becomes a maximum pressure range.

* * * * *